Nov. 13, 1956   J. W. EASTES   2,770,629
PREPARATION OF PHTHALOCYANINE PIGMENTS
Filed Jan. 8, 1952
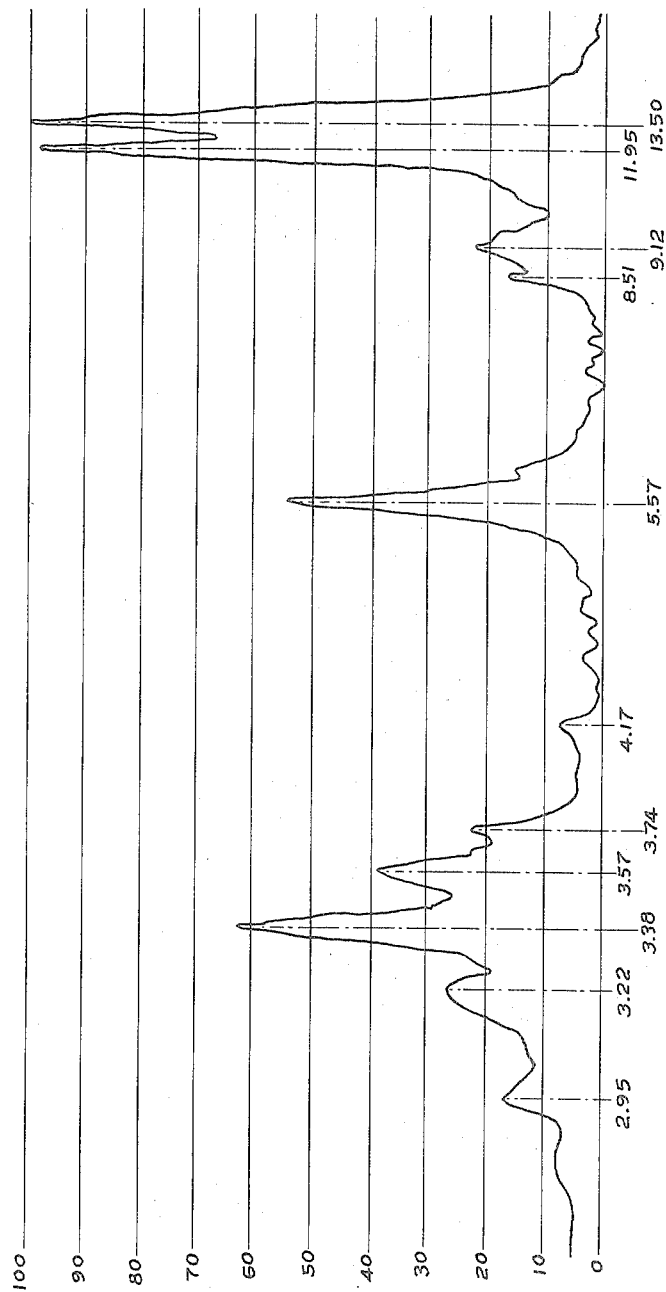
INVENTOR
JOHN W. EASTES,
BY
ATTORNEY

2,770,629

PREPARATION OF PHTHALOCYANINE PIGMENTS

John W. Eastes, Somerville, N. J., assignor to American Cyanamid Company, New York, N. Y., a corporation of Maine Application January 8, 1952, Serial No. 265,523

20 Claims. (Cl. 260—314.5)

This invention relates to the preparation of improved phthalocyanine pigments and more particularly to an improved process of finishing metal phthalocyanines in a finely-divided form exhibiting high tinctorial strength and tinctorial stability in aromatic solvents.

Crude essentially chlorine-free copper phthalocyanine is isolated from reaction mixtures in the stable alpha crystal form. The crystals are in the form of large, long needles, which have no tinctorial strength and consequently the crude phthalocyanine has no pigmentary value.

The generally-accepted method of producing a finished phthalocyanine pigment has been to subject the crude pigment to acid-pasting. This process involves dissolving the pigment in concentrated sulfuric acid, followed by drowning in water to precipitate the pigment. This procedure produces a pigmentary product in a fine state of subdivision having a particle size of the order of a fraction of a micron. In the process, the product is transformed into the unstable or beta crystal form and the shade of the blue pigment is reddish blue and the pigment has excellent tinctorial strength.

Because of the polymorphic character of the phthalocyanines, however, this unstable beta form reverts to the alpha form when exposed to aromatic solvents such as benzene or toluene which are customarily used as vehicles in paint, enamel and lacquer systems in which the color is employed as a pigment. This reversion to the alpha form causes the crystals to increase in size to such a degree that the phthalocyanine can no longer be considered a pigment as the strength is only about 20–30% of that before the transformation. Consequently, the tinctorial value of the coating composition is destroyed.

The problem of crystal growth of the phthalocyanines in aromatic solvents was solved by Wiswall, as disclosed in United States Patent No. 2,486,351, and by Loukomsky, as disclosed in United States Patent No. 2,486,304, wherein the phthalocyanine was either exposed to the action of a crystallizing liquid such as xylene or toluene and then reduced to a fine particle size by grinding with a grinding aid, followed by re-exposure to the liquid, or wherein the phthalocyanine, grinding aid and the crystallizing liquid were subjected to an intensive mixing operation. In both of these processes the crystals are converted into particles of pigment dimension in the stable alpha form and the particles are stable to crystal growth in aromatic solvents and, therefore, the pigment may be incorporated into coating compositions containing these solvents and stored for prolonged periods of time without any change in crystal size and consequently with no diminishing of the tinctorial strength of the pigment. In the Wiswall and Loukomsky processes, the shade of the blue pigment is shifted substantially toward the green.

For many purposes, it would be desirable to produce a reddish shade of the blue pigment, such as is produced by the regular acid-pasting operation, but which can be treated so as to become stable to crystal growth in aromatic solvents without entailing a shift in shade toward the green.

The present invention relates to a process of treating metal phthalocyanines prepared by a particular process in a manner such that a non-crystallizing, red shade, beta form phthalocyanine pigment is produced.

The more detailed description will be concerned with copper phthalocyanine which is commercially the most important phthalocyanine pigment although it will be understood that the invention is generic in character and may be applied to other phthalocyanines with equally good results.

In carrying out the present invention, crude copper phthalocyanine, which has been prepared in an autoclave in a saturated alicyclic hydrocarbon solvent, is subjected to an acid-slurrying operation with aqueous sulfuric acid of a concentration ranging from about 62.5% to about 80%. With such concentrations of acid, the pigment does not dissolve nor is it crystallized but is caused to swell and after removal of the liquid and drying of the pigment, a soft textured product having a very fine particle size is obtained. In general, the resulting product has a higher tinctorial strength than that produced by the conventional acid-pasting procedures. More importantly, however, the new product has outstanding resistance to crystallization in aromatic solvents whereas the conventional acid-pasted products have virtually no resistance to crystallization in such solvents and suffer a loss in tinctorial strength amounting frequently to as much as 80% of the original color value.

I have found that two concentrations of aqueous sulfuric acid, namely, about 65% and about 78% produce products having maximum tinctorial strength whereas if the acid concentration is above about 80%, pigments of very low strength are obtained. I have no means for accounting for this unusual phenomenon and therefore the present invention is not limited to any particular theory of action. I believe, however, that with acid concentrations in excess of 80% large crystals are formed which have little or no tinctorial strength.

I have also observed that if the concentration of aqueous sulfuric acid is reduced to 60% or lower, a new crystal form of copper phthalocyanine is produced which is identified here as the gamma form. The crystal form of this product will be described more in detail hereinafter.

I have found that only those phthalocyanine pigments prepared in an autoclave in a saturated alicyclic hydrocarbon solvent, respresentative examples of which are cyclohexane, methylcyclohexane, dimethylcylohexane, ethylcyclohexane, decalin and the like, respond to the treatment disclosed herein. Phthalocyanine pigments prepared by other processes or prepared in other solvents do not appear to be stabilized against crystal growth by the disclosed treatment. It may be that the pigments prepared by the specified process are in some way unique in that they respond especially well to treatment by the present invention. At any rate, pigments prepared by other processes, when treated by the process disclosed herein, have no significant increase in resistance to crystallization in aromatic solvents whereas phthalocyanines prepared in accordance with the specified process, and treated as disclosed herein, have outstanding resistance to crystallization as evidenced by the fact that when subjected to the acid-slurrying treatment as described herein such treated pigments have withstood 8 hours in boiling xylene or over 4,000 hours exposure in toluene at 54° C. without any loss in strength or reversion to the alpha crystal form.

The concentration of aqueous sulfuric acid, that is, from about 62.5% to about 80% is critical in that stronger acid concentrations than those contemplated herein either produce growth of the pigment crystals so that a severe loss in tinctorial strength is obtained or if the concentration is too high, decomposition of the pigment occurs. If an acid concentration of 60% or lower is used there is no appreciable swelling of the pigment and the gamma crystal form is produced. At the preferred concentrations of about 65% and about 78% maximum purity and tinctorial strength is obtained.

The amount of sulfuric acid used in the slurrying treatment is not particularly critical. Generally, a ratio of the order of one part pigment to 14 or 20 parts aqueous sulfuric acid has been found to produce satisfactory results although smaller amounts of acid may be used if desired. In any event, sufficient acid should, of course, be employed to obtain efficient agitation.

The temperature of the slurry and the slurrying time are factors to be taken into consideration. In general, slurrying times varying from 1 hour up to 2 days have been employed with good results. While there appears to be no direct ratio between slurrying time and concentration of the aqueous acid, in general, when high concentrations of acid are employed, the time of slurrying is reduced and when the concentration of the acid is lower the time of slurrying is longer.

Temperatures ranging from about 5° C. to about 30° C. have been used with good results. Higher temperatures do not appear to improve the product and while at such temperatures a softer powder may be obtained, the pigments have a tendency to be duller and weaker than those obtained at a lower slurrying temperature. Therefore, I prefer to use temperatures not much above 25° C. and have found that optimum results are obtained at about room temperature.

As stated hereinabove, by the use of aqueous sulfuric acid having a concentration of 60% or lower the gamma crystal form of copper phthalocyanine blue is obtained. To obtain this crystal form it is not necessary to use as the starting material crude copper phthalocyanine prepared in saturated alicyclic hydrocarbon solvents. Almost any type of copper phthalocyanine crude when slurried in sulfuric acid having a concentration of 60% or lower appears to produce this crystal form. Nor is this the only known method by which this crystal form may be produced. Salts of phthalocyanine pigments produced according to the method described in the Lecher et al. Patent No. 2,524,672 have been identified as being in the gamma crystal form.

For purposes of a clearer understanding of this polymorphic crystal structure, reference is made to the accompanying drawing which shows the X-ray diffraction pattern of copper phthalocyanine possessing the gamma crystal structure. The abscissa is on the customary non-uniform scale of interplanar crystal spacing as drawn by a recording spectrometer which has a mechanically movable Geiger counter. The vertical scale is in percent of the strongest line. It will be observed from the drawing that the gamma crystal form has a doublet of maximum intensities at an interplanar spacing of about 11.95 and 13.5 A., and third and fourth strongest lines at 5.57 and 3.38 A., respectively.

The conditions of acid-slurrying at concentrations ranging from about 62.5% to about 80% are subject to considerable variation. As will be illustrated more in detail in the specific examples, the pigment may be subjected to simple acid-slurrying in aqueous sulfuric acid of the preferred strength; or the pigment may be slurried in the specified concentration of sulfuric acid followed by the addition of xylene sulfonic acid and slurrying therein; or xylene may be sulfonated in concentrated (98%) sulfuric acid followed by dilution with water to produce the desired concentration of acid which may then be used for slurrying the pigment; or the pigment may be subjected to acid-pasting in a concentrated sulfuric acid-xylene sulfonic acid mixture, this mixture then being diluted with water to the desired concentration and the pigment slurried therein; or the pigment may be given a conventional acid-pasting treatment at 50–55° C. for one hour with concentrated sulfuric acid followed by the addition of xylene, cooling and dilution of the mixture to the desired acid concentration and the pigment slurried therein.

In all of the foregoing processes, the pigment slurry is thereafter drowned in water and filtered. The pigment is then preferably neutralized by reslurrying in a dilute solution of sodium carbonate, filtered, washed to remove all traces of the carbonate, and dried.

The pigments treated as specified in the following examples were tested for resistance to crystallization by either the boiling xylene test or exposure to toluene, or both. In the boiling xylene test, 2 parts of the pigment were placed in 200 parts of xylene which was brought to a boil in 10 minutes. The beginning of boiling was counted as zero time. The pigment was inspected microscopically at zero time and at intervals thereafter to determine if any long needle crystals of the alpha form were forming. At the end of the boiling period, the pigment was filtered from the xylene suspension, dried and ground in a Hoover muller. Ink pull-downs were then made to determine the tinctorial strength of the pigment. In the toluene test, 1 part of the pigment was suspended in 20 parts of toluene which was maintained at 54° C. From time to time the pigment was examined microscopically to determine if there had been any change in crystal form. At the end of the test, the pigment was filtered, dried and tested for strength as described above. The results of these tests were confirmed by X-ray diffraction examination to determine if there had been any reversion to the alpha crystal form.

The following examples are illustrative of the present invention, all parts being by weight unless otherwise specified:

Example 1

The crude copper phthalocyanine used in this example was prepared by the process disclosed in United States Patent No. 2,318,783 substituting methylcyclohexane as the solvent for the nitrobenzene used therein. 1 part of this crude was stirred into 20 parts of sulfuric acid having a concentration of 65%. The pigment was added to the acid with stirring and was slurried therein for 26 hours at a temperature of 25° C. At the end of this time, the thick mixture was poured with rapid stirring into 100 parts of water. This was filtered and the filter cake was suspended in 100 parts of a 1% sodium carbonate solution, stirred, filtered, washed with water and dried. The resulting red shade pigment had an ink strength of 92% as compared to a commercially available acid-pasted copper phthalocyanine pigment. When a portion of this new product was boiled in xylene for 6 hours its tinctorial strength was increased to 103%. Another portion of the treated product was soaked in toluene for over 4,000 hours at a temperature of 54° C. At the end of this period, this product had a strength of 106%. Microscopic analyses of both the boiled pigment and the pigment soaked in toluene showed no evidence of crystal growth. X-ray analyses of both the boiled and the soaked pigment showed them to be in the beta crystal form. The new solvent-stable product can be incorporated into inks, lacquers or other coating compositions containing crystallizing liquids without any substantial change in color value on standing. For purposes of comparison, a control copper phthalocyanine pigment was acid-pasted in the conventional manner by using concentrated (96%) sulfuric acid. When this pigment was boiled in xylene it completely reverted to the alpha crystal form in 1½ hours and its tinctorial strength was only 30% of the strength before acid-pasting. Another sample of the control pigment was exposed to toluene for 96 hours at 54° C. At the end of this period, the control pigment had changed completely to the alpha form and its tinctorial strength had dropped to 70%.

Example 2

The procedure of the preceding example was repeated with the exception that the methylcyclohexane crude was slurried in sulfuric acid having a concentration of 80.5% by weight for 2 hours at a temperature of 5° C. The pigment was recovered and dried as specified in the preceding example. The resulting pigment had an ink strength of 98% as compared to the commercial product. A sample of the new product when boiled in xylene for 6 hours increased in strength to 106%. The boiled pigment had the same crystal structure as the product of Example 1.

Example 3

The procedure of Example 1 was repeated with the exception that the pigment was slurried with 79.5% sulfuric acid for 23 hours at a temperature of 25° C. After neutralization, filtering, washing, and drying, the treated pigment had a tinctorial strength of 102% as compared to the commercial product. The treated pigment, when boiled for 6 hours in xylene, had a strength of 95% of its strength before boiling and had the same crystal structure as the product of Example 1.

Example 4

The procedure of Example 1 was repeated with the exception that the pigment was slurried in 78.0% sulfuric acid for 4 hours at a temperature ranging from 27°–31° C. This product had an ink strength of 113% as compared to the commercial product. After boiling for 6 hours in xylene the strength of the treated pigment was 97% of the strength it had before boiling in xylene and had the same crystal structure as the product of Example 1.

Example 5

The procedure of Example 1 was repeated except that the pigment was slurried in 78.0% sulfuric acid for 1 hour at a temperature of 25–28° C. The treated pigment had a tinctorial strength of 103% as compared to the commercial product and after boiling for 6 hours in xylene the strength of the treated product was 100% of the value before boiling in xylene. The treated pigment had the same crystal structure as the product of Example 1.

Example 6

The procedure of Example 1 was repeated except that the sulfuric acid had a concentration of 70.3% and a 3-hour slurry at a temperature of 22–26° C. was used. The strength of the treated pigment was 98% of the commercial product and after boiling for 6 hours in xylene the strength of the treated product increased to 105% of the value obtained before boiling in xylene. The treated pigment had the same crystal structure as the product of Example 1.

Example 7

The procedure of Example 1 was repeated using 64.2% sulfuric acid for 48 hours at a temperature of 25° C. The treated pigment had a strength of 94% as compared to the commercial product and after boiling for 7½ hours in xylene showed no loss in strength. The product of this example had the same crystal structure as the product of Example 1.

Example 8

1 part of the pigment as used in Example 1 was stirred into 14 parts of 78.1% sulfuric acid at a temperature of 27–30° C. The mixture was stirred at this temperature for 4½ hours. At the end of this time the mixture was poured into 70 parts of water, stirred for 1 hour, the water slurry filtered, and washed with water. The filter cake was then reslurried in 70 parts of 1% sodium carbonate solution. This was stirred, filtered, washed with water and dried. The resulting product had a strength of 107% as compared to the commercial product and after boiling for 6 hours in xylene the pigment had a strength of 94% of that before boiling and had the same crystal structure as the product of Example 1.

Example 9

200 parts of crude copper phthalocyanine, prepared by the process disclosed in United States Patent No. 2,318,783 substituting methylcyclohexane as the solvent for the nitrobenzene used therein, were stirred into 2800 parts of 77.9% sulfuric acid at below 25° C. The mixture was stirred for 3 hours at 25–28° C. At the end of this time there was added to the mixture 560 parts of xylene sulfonic acid which had been prepared by adding 1 part of xylene to 3 parts of 96% sulfuric acid and heating at 70–75° C. for 1½ hours. The total mixture was agitated for 1 hour at 25–26½° C. The mixture was poured into 16,000 parts of water and agitated. It was then filtered and the filter cake washed with water. The filter cake was then reslurried in 14,000 parts of water in which 75 parts of sodium carbonate had been dissolved. This mixture was agitated for 2 hours at room temperature and then the pigment was filtered off and washed with water. The pigment was dried over night at 55° C. This product had a strength of 103% as compared to the commercial product. A portion of this product when boiled for 6 hours in xylene showed a tinctorial strength of 106% of the value before boiling and had the same crystal structure as the product of Example 1.

Example 10

20 parts of xylene were added to 229 parts of 96% sulfuric acid at 42° C. The mixture was heated at 75–78° C. for 1 hour and was then cooled to below 60° C. and 73 parts of water were added. This gave a concentration of 73% sulfuric acid, no allowance being made for the sulfonation of the xylene. The diluted acid was cooled to 16° C. and 20 parts of the pigment as used in the preceding example were added at this temperature. The pigment slurry was stirred for 3 hours at below 28° C. after which it was poured into 2,000 parts of water. After stirring for 1 hour the pigment slurry was filtered and the filter cake reslurried in 2,000 parts of water containing 20 parts of sodium carbonate. The sodium carbonate suspension was agitated for ½ hour and left standing over night. Thereafter, the pigment was filtered, washed with water and dried in an oven for 7 hours at 50° C. The resulting product had a strength of 109% as compared to the commercial product. A portion of the treated pigment when boiled in xylene for 6 hours showed a strength of 106% of the value before boiling in xylene and had the same crystal structure as the product of Example 1.

Example 11

The procedure of the preceding example was repeated with the exception that the pigment was added to a xylene sulfonic acid-sulfuric acid mixture that had been diluted to a calculated value of 78% instead of 73% as in the preceding example. The product of this example had a strength of 108% as compared to the commercial product and after boiling for 6 hours in xylene it had a strength of 96% as compared to its strength before boiling in xylene. The product had the same crystal structure as the product of Example 1.

Example 12

20 parts of xylene were added to 280 parts of 96% sulfuric acid at a temperature of 50° C. The mixture was heated for ½ hour at 70–75° C. The solution was then cooled to 50° C. and 20 parts of the pigment as used in Example 9 were added to the mixture at 50–55° C. The pigment-sulfuric acid mixture was kept at 50–55° C. for ½ hour. It was then cooled to 12° C. and 133 parts of water were added at such a rate that the temperature did not rise above 37° C., an ice bath being used for cooling during the addition of the water. The diluted mixture which had a calculated sulfuric acid concentration of 65% was then agitated for 3 hours at a temperature of 25–31° C. At the end of this time the mixture was poured into 2,000 parts of water at room temperature. After stirring for ½ hour, the diluted solution was filtered and the filter cake reslurried in 2,000 parts of sodium carbonate solution containing 20 parts of sodium carbonate. After agitating for 1 hour the pigment was filtered, washed with water, and dried at 50° C. The dried pigment had a strength of 100% as compared to the commercial product and after boiling for 6 hours with xylene it had a strength of 104% of that before boiling. The product had the same crystal structure as the product of Example 1.

Example 13

20 parts of the pigment as used in Example 9 were added to 280 parts of 96% sulfuric acid at a temperature of 50–54° C. This temperature was maintained for 1 hour. At the end of this time 20 parts of xylene were added. This caused the temperature to rise to 66° C. and then gradually recede. After about 15 minutes the temperature had fallen to 50° C. and at this point the mixture was cooled with an ice bath to 10° C. 151 parts of water were then gradually added so that the temperature did not rise above 20° C. This diluted mixture, having a calculated value of 62.5% sulfuric acid, was then stirred for 3 hours at a temperature of 20–29° C. At the end of this period the pigment slurry was poured into 2,000 parts of water and processed as described in the preceding example. The product of this example had a tinctorial strength of 97% as compared to the commercial product and after boiling for 6 hours in xylene its strength rose to 100%. The crystal form of the boiled product was the same as the product of Example 1.

Example 14

The procedure of the preceding example was repeated with the exception that the pigment-xylene-sulfuric acid mixture was diluted with 133 parts of water instead of the 151 parts of water as in Example 13 which gave a calculated value of 65% sulfuric acid. This mixture was stirred for 4 hours instead of 3 hours as in the preceding example. The product of this example had a tinctorial strength of 99% as compared to the commercial product and after boiling for 6 hours in xylene its strength rose to 101% of the value before boiling. The product had the same crystal structure as the product of Example 1.

Example 15

20 parts of the crude as used in Example 9 were added to 322 parts of 96.9% sulfuric acid at a temperature of 50–55° C. The mixture was agitated and the temperature was maintained for 1 hour. At the end of this time the mixture was cooled to 2° C. and 78 parts of water were added, keeping the temperature below 20° C. This dilution gave a calculated 78% sulfuric acid concentration. The mixture was then stirred for 2½ hours at a temperature of 20–27° C. Thereafter the mixture was drowned in water and processed as in Example 14. The product of this example had a tinctorial strength of 60% as compared to the commercial product. A portion of this product was boiled in xylene for 2 hours and the tinctorial strength was 94% of that of the material before boiling. The product had the same crystal structure as the product of Example 1.

Example 16

The procedure of Example 10 was repeated except that the pigment used was prepared by the process disclosed in United States Patent No. 2,318,783 substituting decalin as the solvent for the nitrobenzene used in the patent. The pigment was treated and isolated as specified in Example 10. The dried pigment had an ink strength of 104% as compared to the commercial product and after boiling for 6 hours in xylene it had a tinctorial value of 105%. The product of this example had the same crystal structure as the product of Example 1.

Example 17

The procedure of Example 15 was repeated with the exception that the sulfuric mixture was diluted to 60%. The pigment was treated and isolated as specified in Example 15. X-ray analysis of this product showed it to possess the gamma crystal structure as shown by the X-ray diffraction spectra illustrated in the drawing.

When concentrations of 40 and 50% sulfuric acid were used it was found that the gamma crystal form was also produced.

It will be understood that the above examples are merely illustrative and while they deal specifically with copper phthalocyanine, the present invention may be applied with similar results to other metal phthalocyanines having polymorphic forms, such as, for example, zinc phthalocyanine, nickel phthalocyanine and the like.

The terminology used herein in referring to the alpha and beta crystal forms of phthalocyanine blue is in accordance with the nomenclature used by R. H. Kienle in Official Digest, Federation of Paint and Varnish Production Clubs, No. 300, page 48, January 1950.

I claim:

1. The method of producing a finely-divided, tinctorially strong, non-crystallizing, red shade, beta form metal phthalocyanine pigment which comprises slurrying a phthalocyanine crude pigment prepared in an autoclave in a saturated alicyclic hydrocarbon solvent, in an aqueous medium comprising sulfuric acid, the sulfuric acid concentration being between about 62.5% and about 80%, drowning the pigment-acid slurry in water, separating the pigment, and neutralizing acid remaining in the pigment.

2. The method as in claim 1 wherein the aqueous sulfuric acid has a concentration of about 65%.

3. The method as in claim 1 wherein the aqueous sulfuric acid has a concentration of about 78%.

4. The method as in claim 1 wherein the alicyclic hydrocarbon is methylcyclohexane.

5. The method as in claim 4 wherein the metal phthalocyanine is copper phthalocyanine.

6. The method as in claim 1 wherein the alicyclic hydrocarbon is decalin.

7. The method as in claim 6 wherein the metal phthalocyanine is copper phthalocyanine.

8. The method as in claim 1 wherein xylene sulfonic acid is added to the aqueous acid.

9. The method as in claim 8 wherein the acid mixture has a sulfuric acid concentration of about 65%.

10. The method as in claim 8 wherein the acid mixture has a sulfuric acid concentration of about 78%.

11. The method of producing a finely-divided, tinctorially strong, non-crystallizing, red shade, beta form metal phthalocyanine pigment which comprises acid-pasting a phthalocyanine crude pigment prepared in an autoclave in a saturated alicyclic hydrocarbon solvent, in a concentrated sulfuric acid-xylene sulfonic acid mixture, diluting said mixture with water to a sulfuric acid concentration of between about 62.5% to about 80%, slurrying the pigment therein, drowning the pigment-acid slurry in water, separating the pigment, and neutralizing the acid remaining in the pigment.

12. The method as in claim 11 wherein the acid mixture is diluted to a sulfuric acid concentration of about 65%.

13. The method as in claim 11 wherein the acid mixture is diluted to a sulfuric acid concentration of about 78%.

14. The method as in claim 11 wherein the alicyclic hydrocarbon is methylcyclohexane and wherein the metal phthalocyanine is copper phthalocyanine.

15. The method as in claim 11 wherein the alicyclic hydrocarbon is decalin and wherein the metal phthalocyanine is copper phthalocyanine.

16. The method of producing a finely-divided tinctorially strong, non-crystallizing, red shade, beta form metal phthalocyanine pigment which comprises acid-pasting a phthalocyanine crude pigment prepared in an autoclave in a saturated alicyclic hydrocarbon solvent, in concentrated sulfuric acid, adding xylene to the mixture, diluting the mixture with water to a sulfuric acid concentration of between about 62.5% to about 80%, slurrying the pigment therein, drowning the pigment-acid slurry in water, separating the pigment, and neutralizing the acid remaining in the pigment.

17. The method as in claim 16 wherein the acid mixture is diluted to a sulfuric acid concentration of about 65%.

18. The method as in claim 16 wherein the acid mixture is diluted to a sulfuric acid concentration of about 78%.

19. The method as in claim 16 wherein the alicyclic hydrocarbon is methylcyclohexane and wherein the metal phthalocyanine is copper phthalocyanine.

20. The method as in claim 16 wherein the alicyclic hydrocarbon is decalin and wherein the metal phthalocyanine is copper phthalocyanine.

References Cited in the file of this patent

UNITED STATES PATENTS

| | | |
|---|---|---|
| 2,284,685 | Detrick et al. | June 2, 1942 |
| 2,359,737 | Lacey et al. | Oct. 10, 1944 |
| 2,375,120 | Loukomsky et al. | May 1, 1945 |
| 2,524,672 | Lechner | Oct. 3, 1950 |
| 2,556,726 | Lane | June 12, 1951 |
| 2,716,649 | Brouillard | Aug. 30, 1955 |